No. 818,714. PATENTED APR. 24, 1906.
H. J. SMITH.
VALVE MECHANISM FOR GAS ENGINES.
APPLICATION FILED FEB. 19, 1904.
2 SHEETS—SHEET 1.
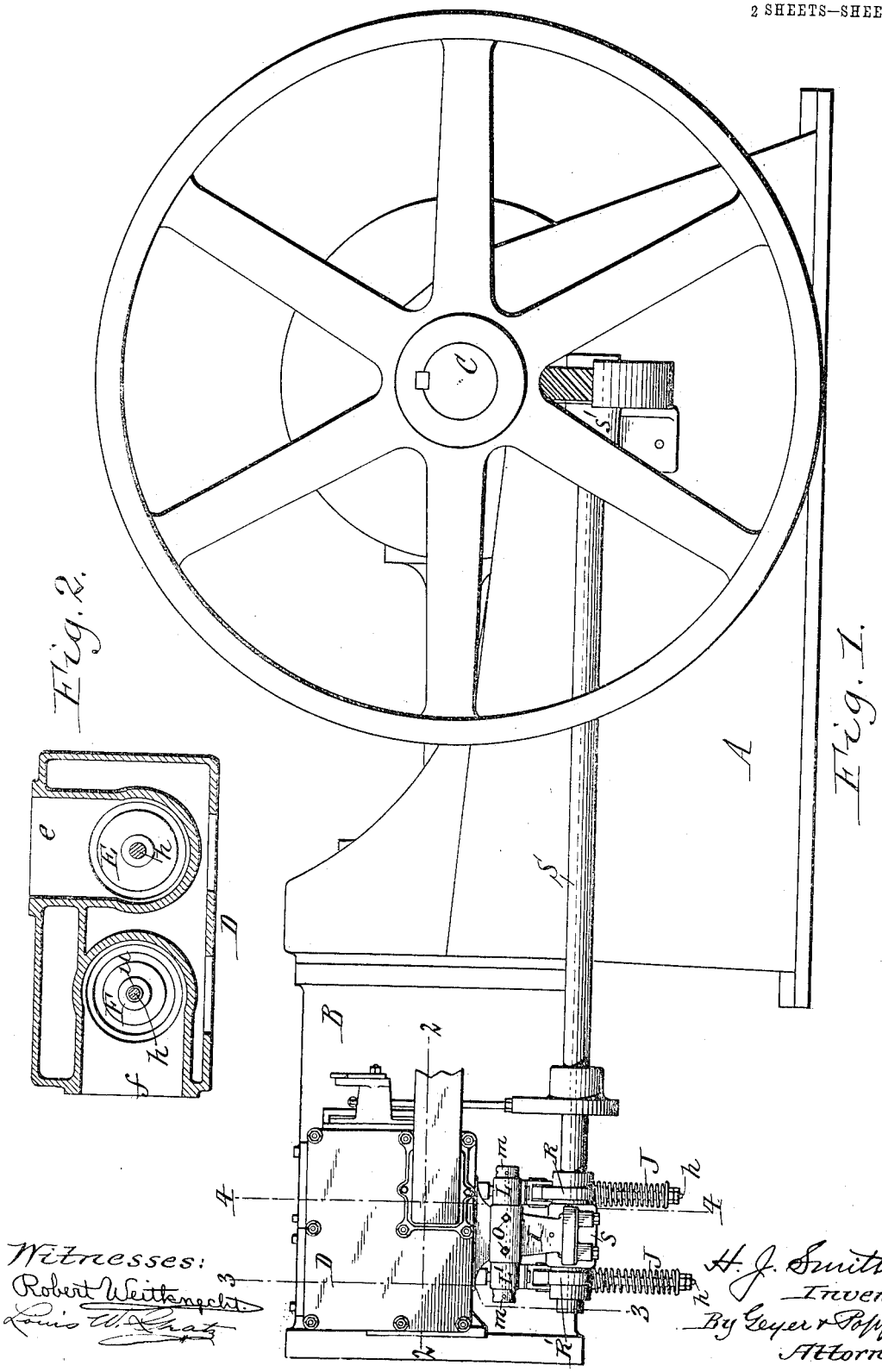

No. 818,714. PATENTED APR. 24, 1906.
H. J. SMITH.
VALVE MECHANISM FOR GAS ENGINES.
APPLICATION FILED FEB. 19, 1904.

2 SHEETS—SHEET 2.

Witnesses:
Robert Weitknecht
Louis W. Gratz

Harry J. Smith
Inventor
By Geyer & Popp
Attorneys

UNITED STATES PATENT OFFICE.

HARRY J. SMITH, OF BUFFALO, NEW YORK, ASSIGNOR TO THE ALBERGER COMPANY, OF BUFFALO, NEW YORK.

VALVE MECHANISM FOR GAS-ENGINES.

No. 818,714.  Specification of Letters Patent.  Patented April 24, 1906.

Application filed February 19, 1904. Serial No. 194,345.

*To all whom it may concern:*

Be it known that I, HARRY J. SMITH, a citizen of the United States, residing at Buffalo, in the county of Erie and State of New York, have invented new and useful Improvements in Valve Mechanism for Gas - Engines, of which the following is a specification.

This invention relates more particularly to a mechanism for operating the reciprocating valves of gas-engines. The mechanism heretofore employed for operating these valves is undesirable, as the same wears unduly and necessitates frequent renewal of the parts.

The objects of this invention are to produce an efficient operating mechanism for this kind of valve in which the wear is reduced to a minimum and in which the parts are of simple construction and convenient of access for inspection, adjustment, or repairs.

Figure 3:
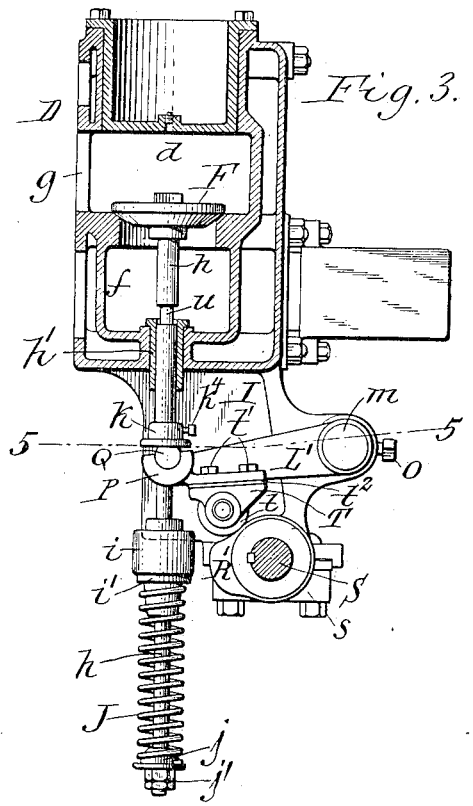
Figure 4:
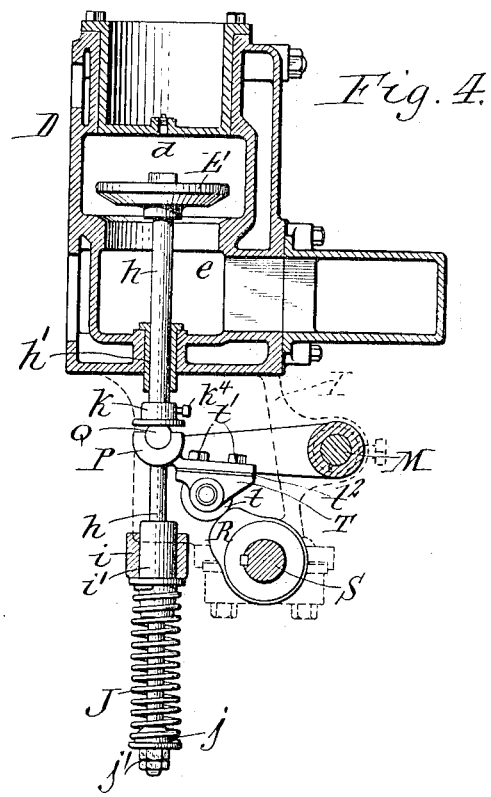
Figure 6:
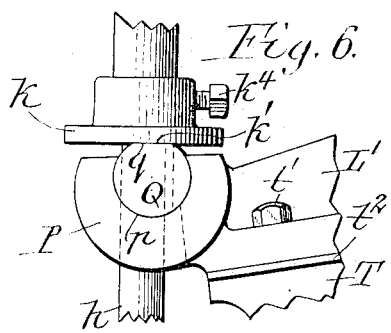
Figure 5:
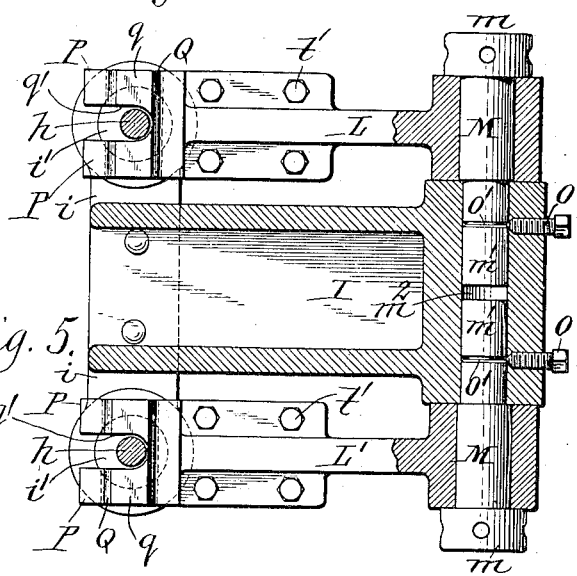
Figure 7:
Figure 8:
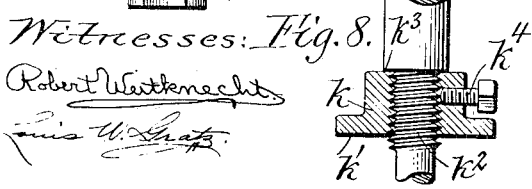

In the accompanying drawings, consisting of two sheets, Figure 1 is a side elevation of a gas-engine embodying my improved valve mechanism. Fig. 2 is a detached horizontal section of the valve-chest, taken in line 2 2, Fig. 1. Figs. 3 and 4 are vertical sections in lines 3 3 and 4 4, Fig. 1, respectively, on an enlarged scale. Fig. 5 is a horizontal section, on an enlarged scale, in line 5 5, Fig. 3. Fig. 6 is a fragmentary side elevation, on an enlarged scale, showing the connection between a valve-stem and its actuating-arm, Fig. 7 is a top plan view of the bearing-piece or shifter-block which is interposed between the collar of the valve-stem and the actuating rock-arm. Fig. 8 is a fragmentary section showing the adjustable shifter-collar on the valve-stem.

Similar letters of reference indicate corresponding parts throughout the several views.

A represents the main frame or base of the gas-engine, B the cylinder, and C the crank-shaft, all of which parts may be of any suitable and well-known construction.

D represents the valve-chest, secured to one side of the cylinder and provided with a valve-chamber $d$, which has a fuel-inlet or supply-passage $e$, an exhaust passage or outlet $f$, and a mixture - passage $g$, connecting the same with the cylinder.

E F represent vertically-movable fuel and exhaust valves, which are arranged side by side and control the opening of the fuel-inlet and exhaust-outlet passages. Each of these valves is opened upon being lifted and is secured to the upper end of an upright valve-stem $h$. This stem passes downwardly through an inner guide or bushing $h'$, arranged on the lower part of the valve-chest, and is connected outside of the chest with the operating mechanism which opens and closes the valve. Between the stems of the fuel and exhaust valves the chest is provided with a depending bracket or hanger I, which is preferably cast integrally with the chest. On the lower inner part of this hanger the same is provided with two laterally - projecting guide-arms $i$, each of which contains an outer guide or bushing $i'$, in which the central part of one of the valve-stems is guided. The guide-arms $i$ are preferably formed at opposite ends of a bar which is secured to the under side of the hanger I, as shown in Fig. 5. Each of the valves is normally held in its closed position by a spring J, surrounding the outer or lower part of its stem and bearing at its upper end against the outer guide or bushing $i'$, while its lower end bears against a washer $j$, supported by adjusting screw-nuts $j'$ on the outer or lower end of the valve-stem. Each valve - stem is provided between its guides $h'$ and $i'$ with a shifter-collar $k$, having a flat shoulder or contact-face $k'$ on its under side.

L L' represent vertically - swinging rock-arms which are arranged in a substantially horizontal position on opposite sides of the hanger and whereby the fuel and exhaust valves are lifted and opened. These rock-arms are pivoted at their outer ends on the outer central part of the hanger by means of horizontal studs or arbors M, each of which has an enlarged outer part or head $m$ and a reduced inner part or shank $m'$. The shanks of both arbors are inserted into opposite ends of a horizontal opening $m^2$, formed in the hanger, so that the axes of both rock-arms are in line. Each rock-arm is confined on its arbor between the head thereof and the adjacent part of the hanger, and the arbor is held against displacement on the hanger by a set-screw $o$, arranged in a threaded opening in the hanger and engaging its inner end with an annular groove $o'$ in the shank of the arbor, as shown in Fig. 5. The inner or free end of each rock-arm is bifurcated or forked, forming two jaws P, between which the stem of the respective valve is arranged. In the upper side of each of these jaws is formed a segmental bearing or socket $p$, the axis of which is horizontal and transversely in line with the socket of the other jaw.

Q Q represent shifter-blocks or bearing-pieces which are interposed between the rock-arms and the shifter-collars $k$ of the valve-stems. Each of these shifter-blocks is of substantially cylindrical form and has a flat upper side or contact-face $q$ and a laterally-opening notch or recess $q'$ in the side of its central part. Each shifter-block is journaled at opposite ends like trunnions in the bearings of one of the rock-arms. Its flat contact-face $q$ bears against the flat contact-face of the adjacent shifter-collar, and its central recess $q'$ receives the adjacent valve-stem. As the rock-arm oscillates in raising and lowering the valve-stem the shifter-block always retains its flat face fully in engagement with the face of the shifter-collar, this being possible owing to the swiveling action of the shifter-block in the sockets of the rock-arm. On account of the differential in the direction of movement of the valve-stem and the actuating rock-arm the shifter-block Q has a slight transverse movement relatively to the shifter-collar. By providing the shifter-block with a flat contact-face for engagement with the flat contact-face of the shifter-collar these parts engage each other by a comparatively large area, whereby these parts are always retained in this relative position. The segmental bearings of the rock-arm are preferably somewhat more than a half-round or semicircle, and the flat face of the shifter block is preferably of such width that the narrowest part of the shifter-block is wider than the top opening of the segmental bearings. This construction of the parts prevents the shifter-block from being disengaged from the rock-arm sockets or bearings by a vertical or lateral movement of the shifter-block relatively to the arm. While the valve-stem is arranged within the recess of the shifter-block, the latter is also held against axial displacement on the rock-arm by the stem. Any additional means for holding the shifter-block in its operative position in the rock-arm are therefore not required, thereby simplifying the construction of the mechanism, effecting a saving in cost and avoiding all liability of getting out of order.

By oiling the coöperating flat faces of the shifter block and collar and the coöperating curved surfaces of the shifter-block and its bearing in the rock-arm the wear upon these parts is imperceptible.

Owing to the constant pounding to which the shifter-collar is subjected, the same is liable to become loose unless securely fastened to the valve-stem. A reliable means for holding the shifter-collar in place consists in screw-threading its bore like a nut and screwing the same upwardly a thread $k^2$ of the valve until the collar engages a downwardly-facing shoulder $k^3$ on the stem, as shown in Fig. 8. The collar may be held against unscrewing by a set-screw $k^4$ or other means. The upper end of the valve-hub is preferably made square so as to permit of applying a wrench thereto for turning the valve and grinding the same in its seat when this is necessary, and also for holding the valve-stem when it is desired to screw the shifter-collar on or off the stem for adjustment or repairs. By constructing the rock-arm in the shape of a fork and engaging the same with the shifter-collar on opposite sides of the valve-stem the latter is relieved from any side thrust or strain which is liable to bend and cramp the same in its guides.

On opposite sides of the hanger are arranged rotary cams R R', whereby the fuel and exhaust valves are opened. These cams are secured to a horizontal shaft S, which is journaled lengthwise of the engine in bearings $s$ $s'$, formed on the lower part of the hanger and on the base adjacent to the crank-shaft. Motion may be transmitted from the crank-shaft to the longitudinal shaft by any suitable gearing, so that the latter makes one turn for every two turns of the former for operating the valves on the well-known four-cycle principle. The cams are located underneath the rock-arms, and each of the latter is provided on its under side with an antifriction-roller $t$, with which the cam engages for lifting the rock-arm. Each of these rollers is preferably mounted in a carrier T, which is secured to the under side of the adjacent rock-arm by bolts $t'$. Any wear on the valve, the contact-surfaces of the shifter collar and block, the cam or the roller can be taken up by placing washers or shims $t^2$ between the rock-arm and the roller carriers or washers between the collar $k$ and the shoulder $k^3$ of the stem.

It has been found in practice that that part of a valve-stem within the chest becomes rough owing to the corrosive effect of the gases, while that part which slides in contact with the guide of the chest remains smooth. This causes the inner part of the valve-stem to stick in the guide at the termination of its contact with the guide, which renders the opening thereof difficult. This sticking of the valve-stem in the chest-guide is particularly liable to happen when the valve or its seat becomes worn and permits the stem to move farther outward or downward in the chest-guide. In order to avoid this, the inner part of the valve-stem is reduced at the termination of its contact with the chest-guide, preferably by forming an annular groove $u$ thereon. By this means a clear space is produced on the stem between the smooth part which slides in the guide and the rough part which is subjected to the corrosive action of the gases within the chest, thereby avoiding sticking of the same in the guide. In the drawings this groove is shown applied only to the stem of the exhaust-valve owing to the corrosive action on the same of the spent gases; but this groove may also be placed on the stem of the fuel-valve if the character of the gaseous fuel which is used has a corroding effect on its stem.

My improved mechanism for operating the valves of gas-engines avoids all liability of bending the valve-stems which otherwise would be liable to occur and cause the same to become cramped and bind in their guides, and the general organization of the parts is such that the same can be readily assembled and dismembered when required.

I claim as my invention—

1. A valve mechanism comprising a valve-stem having a flat contact-face, a rock-arm having a circular bearing, and an oscillating shifter-block having a circular part turning in said bearing and a flat contact-face which coöperates with the corresponding flat face of said stem, substantially as set forth.

2. A valve mechanism comprising a reciprocating valve-stem, a shifter-collar secured to said stem and provided with a flat contact-face, a rock-arm having a circular bearing of which a peripheral portion is removed, and an oscillating shifter-block having a circular part turning in said bearing and a flat contact-face on its periphery which coöperates with the contact-face of said collar, substantially as set forth.

3. A valve mechanism comprising a reciprocating valve-stem, a shifter-collar secured to said stem and provided with a flat contact-face, a rock-arm having jaws between which said stem is arranged and each jaw having a circular bearing, and an oscillating shifter-block having circular ends which turn in the bearings of said jaws and a flat contact-face on its periphery which coöperates with the flat face of said collar, substantially as set forth.

4. A valve mechanism comprising a reciprocating valve-stem, a shifter-collar secured to said stem and provided with a flat contact-face, a rock-arm having jaws each of which has a circular bearing, and an oscillating shifter-block having circular ends which turn in the bearings of said jaws, a flat contact-face on its periphery which coöperates with the face of said collar and a laterally-opening recess in its central part which receives said stem, substantially as set forth.

5. A valve mechanism comprising a reciprocating valve-stem, a shifter-collar secured to said stem and having a flat transverse contact-face, a rock-arm having a pair of jaws each of which has a circular bearing of which a peripheral part is removed, and a shifter-block having circular ends which turn in the bearings of said jaws, a flat contact-face on its periphery which projects through the open parts of said bearings into engagement with the contact-face of said collar and a laterally-opening recess between its ends which receives said valve-stem, substantially as set forth.

6. A valve mechanism comprising a valve-stem, a hanger having an opening, an arbor having a head at one end and a shank at its opposite end which is seated in said opening and provided with an annular groove, a screw arranged on said hanger and engaging with said groove and a rock-arm for actuating the valve-stem pivoted on said arbor between its head and the hanger, substantially as set forth.

7. A valve mechanism comprising a valve, a stem connected with said valve and having a shoulder and a screw-thread below said shoulder, a threaded shifter-collar which is screwed on the thread of the stem and against the shoulder thereof, and a rock-lever engaging said collar, substantially as set forth.

Witness my hand this 13th day of February, 1904.

HARRY J. SMITH.

Witnesses:
LILIAN M. SMITH,
JOHN G. LOWRY.